Aug. 18, 1970   H. D. CHURCH ET AL   3,524,482
WIRE UNWRAPPING APPARATUS
Filed June 28, 1968   6 Sheets-Sheet 6

United States Patent Office 3,524,482
Patented Aug. 18, 1970

3,524,482
WIRE UNWRAPPING APPARATUS
Hoye D. Church and Edwyn H. Petree, Burlington, N.C., assignors to Western Electric Company, Incorporated, New York, N.Y., a corporation of New York
Filed June 28, 1968, Ser. No. 740,945
Int. Cl. B21f 45/00
U.S. Cl. 140—149                                    18 Claims

ABSTRACT OF THE DISCLOSURE

An automatic wire unwrapping apparatus includes an unwrapping head mounted on an X, Y, Z coordinate indexing mechanism. The indexing mechanism is numerically controlled to sequentially unwrap the ends of wires wrapped on terminals. The unwrapping head includes facilities for rotating an unwrapping tool in alternate directions to unwrap wires which may be wound in alternate directions. There is also included facilities for sensing when the wrapped wire has been loosened to terminate the unwrapping of the wire. Additional facilities sense an obstruction in the path of the unwrapping tool.

GOVERNMENT CONTRACT

The invention herein claimed was made in the course of or under contract with the U.S. Army.

BACKGROUND OF THE INVENTION

Field of the invention

In the manufacture of complex electronic equipment, wiring is made on terminal boards or logic boards by automatic wire wrapping facilities. Sometimes an error may be made in the programming of the wire wrapping facilities and a wire may be wrapped on the wrong terminal or a design change may subsequently require the removal of a wire wrapped on a terminal. This invention relates to apparatus for removing a wire which has been wrapped on a terminal.

Description of the prior art

There are a plurality of prior art devices for unwrapping a wire from a terminal. However, the prior art devices are hand tools which must be manually operated to individually unwrap each end of a wire. Where a large number of boards must be unwrapped, it becomes inefficient to unwrap each of the boards manually. Also, unwrapping the boards manually may result in additional errors being made.

SUMMARY OF THE INVENTION

An object of the present invention is an apparatus for automatically unwrapping a wire from a terminal.

In accordance with this and other objects, an apparatus includes an unwrapping head mounted on indexing facilities for moving the unwrapping head over a desired terminal. Facilities then opearte the unwrapping head to unwrap a wire from a selected terminal.

Another feature of the invention incorporates facilities for rotating a tool in a first direction and then in a second direction to unwrap a wire whose direction of wind is not known.

Still another feature of the invention incorporates facilities for sensing when a wire has been loosened from a terminal to raise the unwarpping head and remove the loosened wrap from the terminal.

A further feature of the invention incorporates facilities for sensing an obstruction or bent terminal to stop the wire wrapping apparatus to prevent damage to the apparatus or terminal.

DETAILED DESCRIPTION

Figure 1:
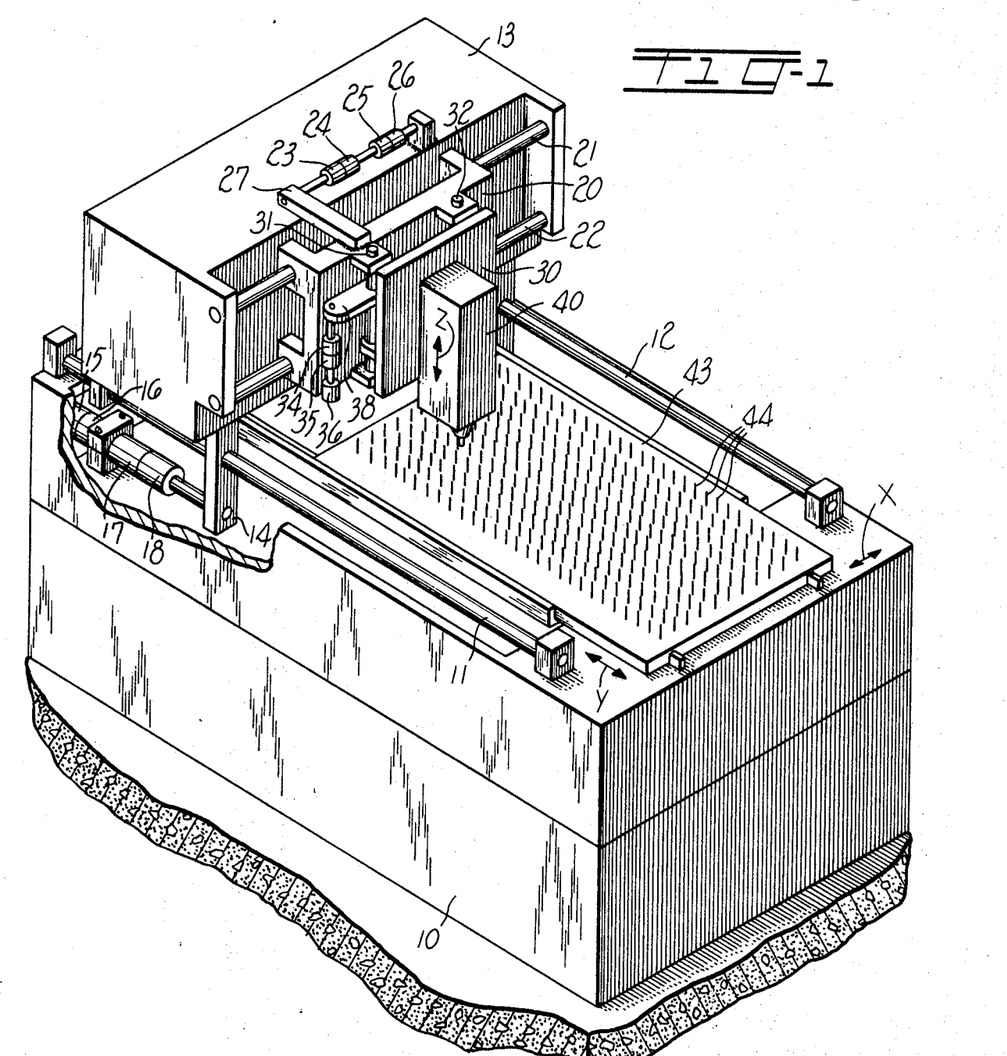
FIG. 1 is an isometric view of an apparatus for automatically unwrapping a wire from a terminal.

Referring first to FIG. 1, there is shown a base 10 supporting an automatic wire unwrapping apparatus. A terminal chassis 43 is laid horizontally on the base 10 and secured thereto by suitable securing devices. The terminal chassis 43 has a plurality of terminals 44 mounted therein which are arranged in columns running in a first horizontal direction Y and rows running in a second horizontal direction X.

A pair of bars 11 and 12 on the base 10 support a frame 13 for movement in the first horizontal direction over the chassis 43. A plurality of serially connected air cylinders 15, 16, 17 and 18 are connected at one end to the base 10 and at the other end to a projection 14 of the frame 13 for moving the frame 13 to a selected horizontal position along the bars 11 and 12. The cylinders 15–18 have different lengths of movement to provide for a plurality of indexing positions along the bars 11 and 12. While only four cylinders 15–18 are shown, more air cylinders would be needed where the terminal boards being opearted on contain many rows of terminals.

A platform 20 is slidably mounted on a pair of bars 21 and 22 connected to the frame 13 for movement in the second horizontal direction X. A plurality of air cylinders 23, 24, 25 and 26 are serially connected between the frame 13 and a projection 27 of the platform 20 for moving the platform 20 to a desired horizontal position along the bars 21 and 22. Again, the number of air cylinders 23–26 and their lengths of movement depends upon the number and spacing of desired columns of terminals to be reached by the unwrapping apparatus.

Similarly, a plate 30 is slidably mounted on a pair of bars 31 and 32 mounted on the platform 20 for movement in a vertical direction Z. Three air cylinders 34, 35 and 36 are serially connected between the platform 20 and a projection 38 of the plate 30 for moving the plate 30 to one of four selected vertical positions. The apparatus herein described utilizes only four different vertical positions for the plate 30 and a wire unwrapping head 40 mounted thereon. More vertical positions may be desirable or utilized.

Figure 2:
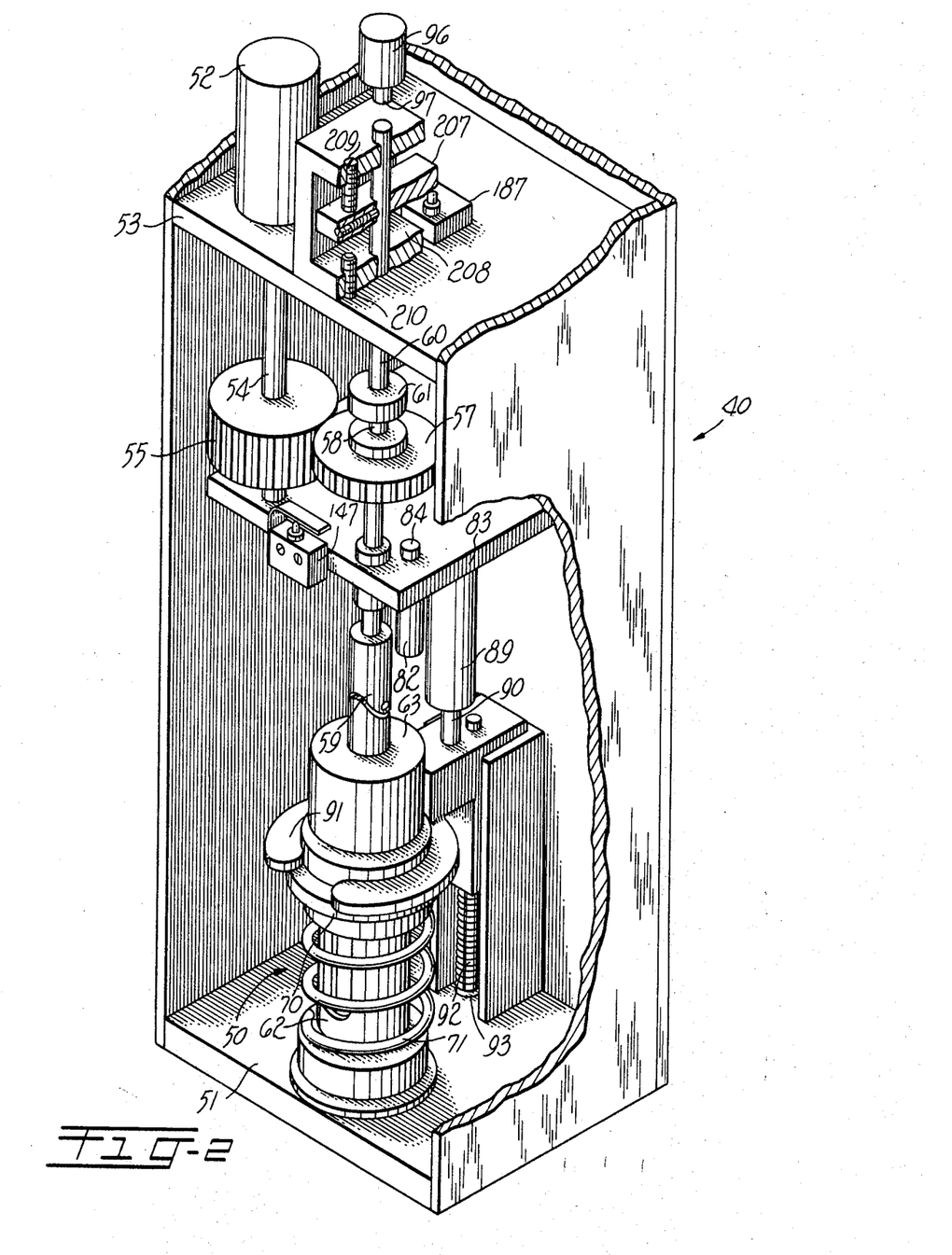
FIG. 2 is an isometric drawing, partially shown in cross section, of the unwrapping head of the apparatus shown in FIG. 1.

Referring now to FIG. 2, there are shown the details of the wire unwrapping head 40. A wire unwrapping tool 50 is supported by a beveled bearing surface in a base 51 of the wire unwrapping head 40. A reversible motor 52 is mounted on a support 53 in the head 40 for rotating a shaft 54. The motor 52 may be a commercial air motor which rotates in a direction determined by the air pressures applied to two inlets thereto. A gear 55 is secured to the shaft 54 and meshes with a pinion 57 secured to a shaft 58. The shaft 58 is connected by a universal joint 59 to the tool 50. Thus, the motor 52 through the shaft 54, gear 55, pinion 57 and shaft 58, rotates the tool 50 either clockwise or counterclockwise.

Figures 3, 3A:
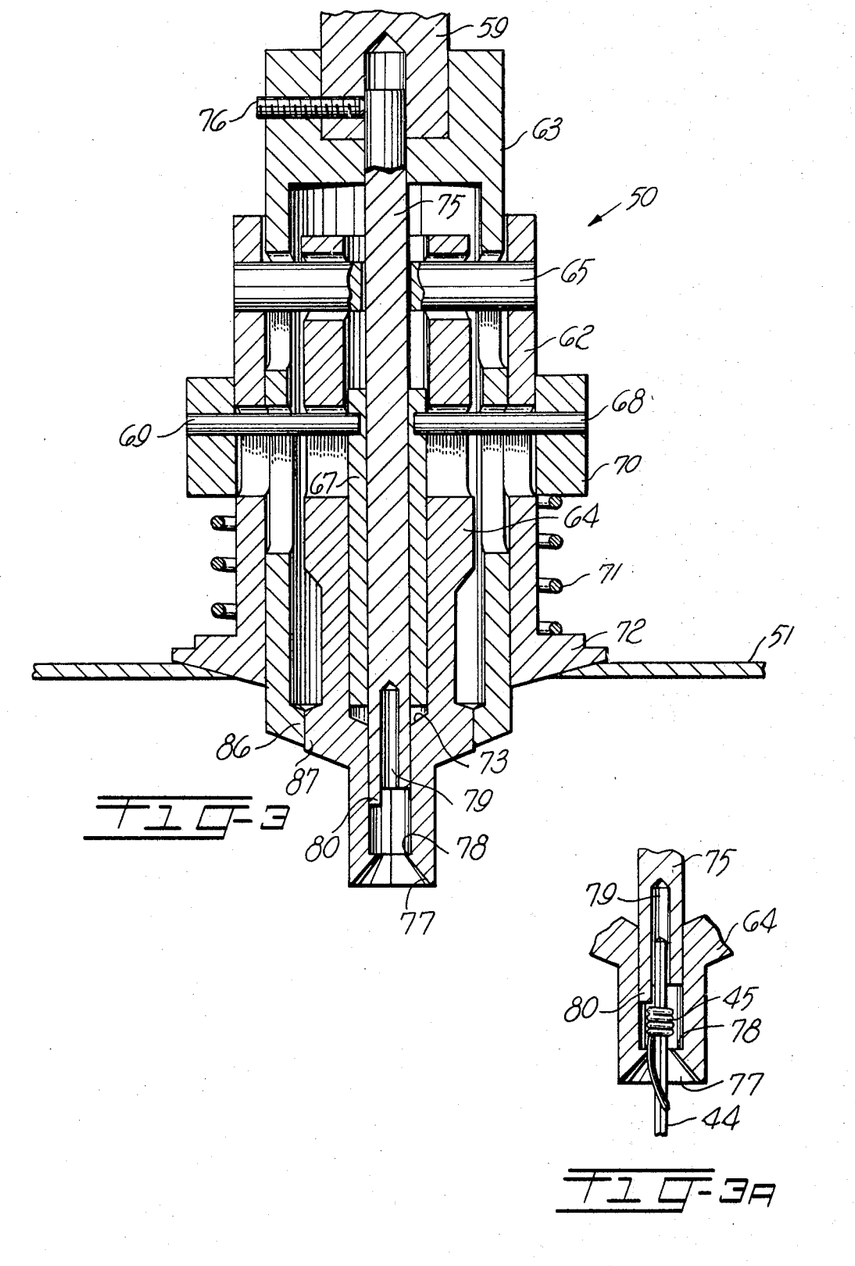
FIG. 3 is a detailed cross-sectional view of an unwrapping tool which is shown in FIGS. 1 and 2.
FIG. 3a is a cross-sectional view of a portion of the unwrapping tool shown in FIG. 3, particularly showing a terminal with a wire wrapped thereon received in the end of the unwrapping tool.
Figure 4:
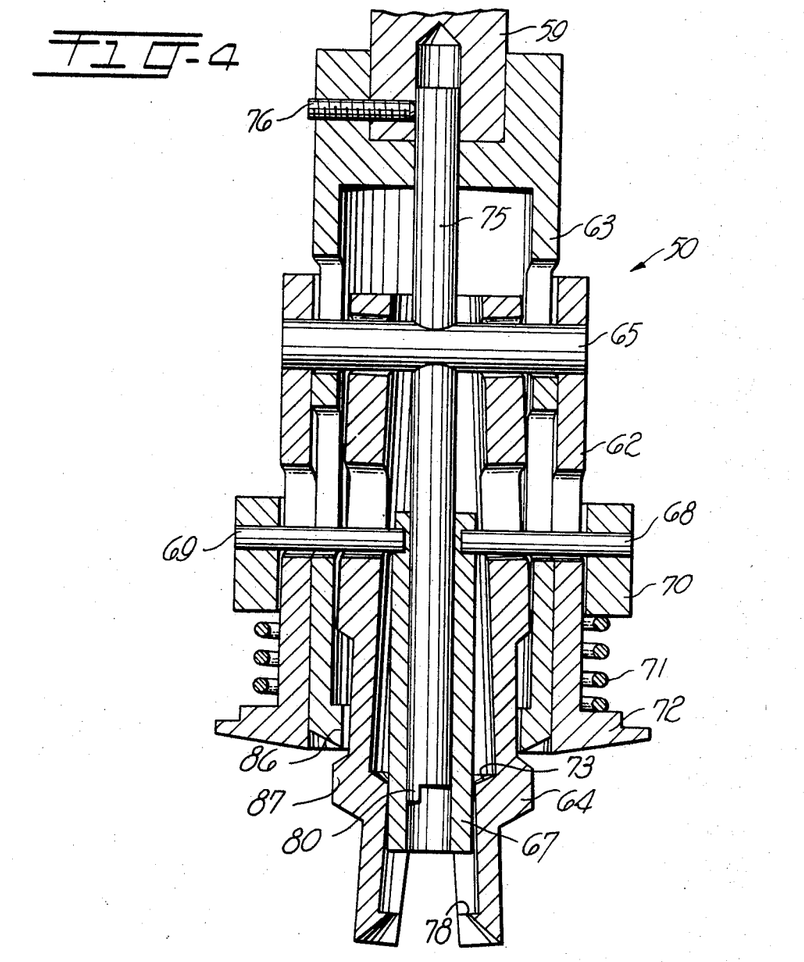
FIG. 4 is a detailed cross-sectional view of the tool shown in FIG. 3 particularly showing the relative position of the parts of the tool during the ejection of a wrap from the tool.

Referring now to FIG. 3, there is shown a detailed view of the tool 50. The tool 50 has a housing 62 which rests upon the beveled bearing surface of the base 51 of the head 40. A holding member 63 secured to the universal joint 59 by a set screw 76 is slidably mounted for relative vertical movement within the housing 62. The two halves of a split wire wrap stripping sleeve 64 are loosely mounted on a pin 65 which is secured to the housing 62. As shown in FIGS. 3 and 4, the holding member 63 has an inwardly extending annular ring 86 which cooperates with an annular rib 87 on the split sleeve 64 for normally holding the split sleeve 64 in a closed position. When the holding member 63 is raised, the annular ring 63 is raised from the rib 87 to allow the two halves of the split sleeve 64 to open. Referring to FIG. 4, the holding member 63 is raised relative to the split sleeve 64 to allow the two halves of the split sleeve 64 to separate.

Referring back to FIG. 3, a wire unwrapping bit 75 is secured by the set screw 76 to the holding member 63 and the universal joint 59. The vertical position of the wire unwrapping bit 75, relative to the holding member 63, may be adjusted by loosening the set screw 76 and moving the bit 75 within the tool 50. As illustrated in FIG. 3a, the wire unwrapping bit 75 has a bore 79 for receiving the upper extremity of a terminal 44 and a projection 80 for engaging the upper portion of a wrapped wire 45 on the terminal 44. When the tool 50 is rotated, the projection 80 engages the end of the wire 45 which is wrapped on the terminal to loosen the wrapped wire.

The lower end of the split sleeve 64 extends over the bit 75 and terminates in a beveled opening 77 for receiving the terminal 44 around which the wire 45 is wrapped. The opening 77 has an inwardly extending annular lip 78. The inside diameter of the lip allows the wrapped wire 45, while still tightly wound on the terminal 44, to enter the sleeve 64. When the wrapped wire 45 is loosened by rotation of the tool 50, the wrapped wire 45 expands within the split sleeve 64. Thus, when the tool 50 is raised from the terminal 44, the loosened wrap 45 is engaged by the lip 78 and pulled from the terminal 44.

Referring back to FIG. 3, an ejecting sleeve 67 is slidably mounted within the split sleeve 64 by a pair of pins 68 and 69 which extend inward from a collar 70 slidably mounted on the housing 62. A spring 71 is interposed between the collar 70 and a lower lip 72 of the housing 62 for normally urging the collar 70 and the wrap ejecting sleeve 67 in an upward direction. When the collar 70 is depressed, as shown in FIG. 4, the lower edge of the ejecting sleeve 67 cooperates with an inside camming surface 73 of the split sleeve 63 to open the two halves of the split sleeve 63 and eject the wrapped wire which has been pulled from a terminal.

Referring back to FIG. 2, there is shown an air cylinder 82 mounted on a platform 83 in the head 40. The air cylinder 82 has a projectable piston rod 84 for engaging the lower surface of the pinion 57 to raise the pinion 57, the shaft 58, the universal joint 59, and the holding member 63 relative to the housing 62 and split sleeve 64 of the tool 50 to the raised position shown in FIG. 4. An air cylinder 96 is positioned over and in alignment with a shaft 60 connected by a bearing 61 to the shaft 58 such that when a piston rod 97 of the air cylinder 96 is extended, the shafts 58 and 60 are moved downward to return the holding member 63 to its closed position shown in FIG. 3.

An air cylinder 89 has a piston rod 90 fastened to a depressing member 91 which is slidable upon a rod 92 secured to the head 40. The member 91 overlaps the collar 70 of the tool 50 such that when the piston rod 90 is extended, the member 91 depresses the collar downward against the normal upward force of the spring 71 to the position shown in FIG. 4 to eject the wire from the split sleeve 64. After the wire has been ejected, the air cylinder 89 is released and the member 91 is returned to its upward position by the force of a spring 93 interposed between the member 91 and the base 51 of the head 40.

Figure 5:
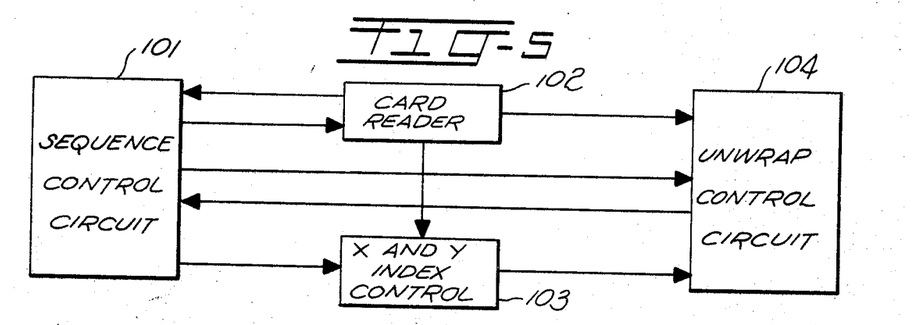
FIG. 5 is a block diagram showing the overall circuitry for controlling the apparatus shown in FIG. 1.

Referring now to FIG. 5, there is shown a block diagram which shows an overall circuit arrangement which may be used to control the automatic wire unwrapping apparatus. A sequence control circuit 101 initiates the operation of a card reader 102 to operate an X and Y index control circuit 103. The X and Y index control circuit 103 operates valves (not shown) to control the air cylinders 15–18 and 23–26 (FIG. 1) to move the head 40 to a selected horizontal position relative to the terminal board 43. The sequence control circuit 101 then initiates an unwrap control circuit 104 which automatically controls the unwrapping of a wire on the selected terminal. Conventional sequence control circuits, card readers, and X and Y index control circuits are believed to be sufficiently similar to the respective circuits 101, 102 and 103 that one skilled in the art could design such circuits capable of performing the functions herein described.

Figure 6:
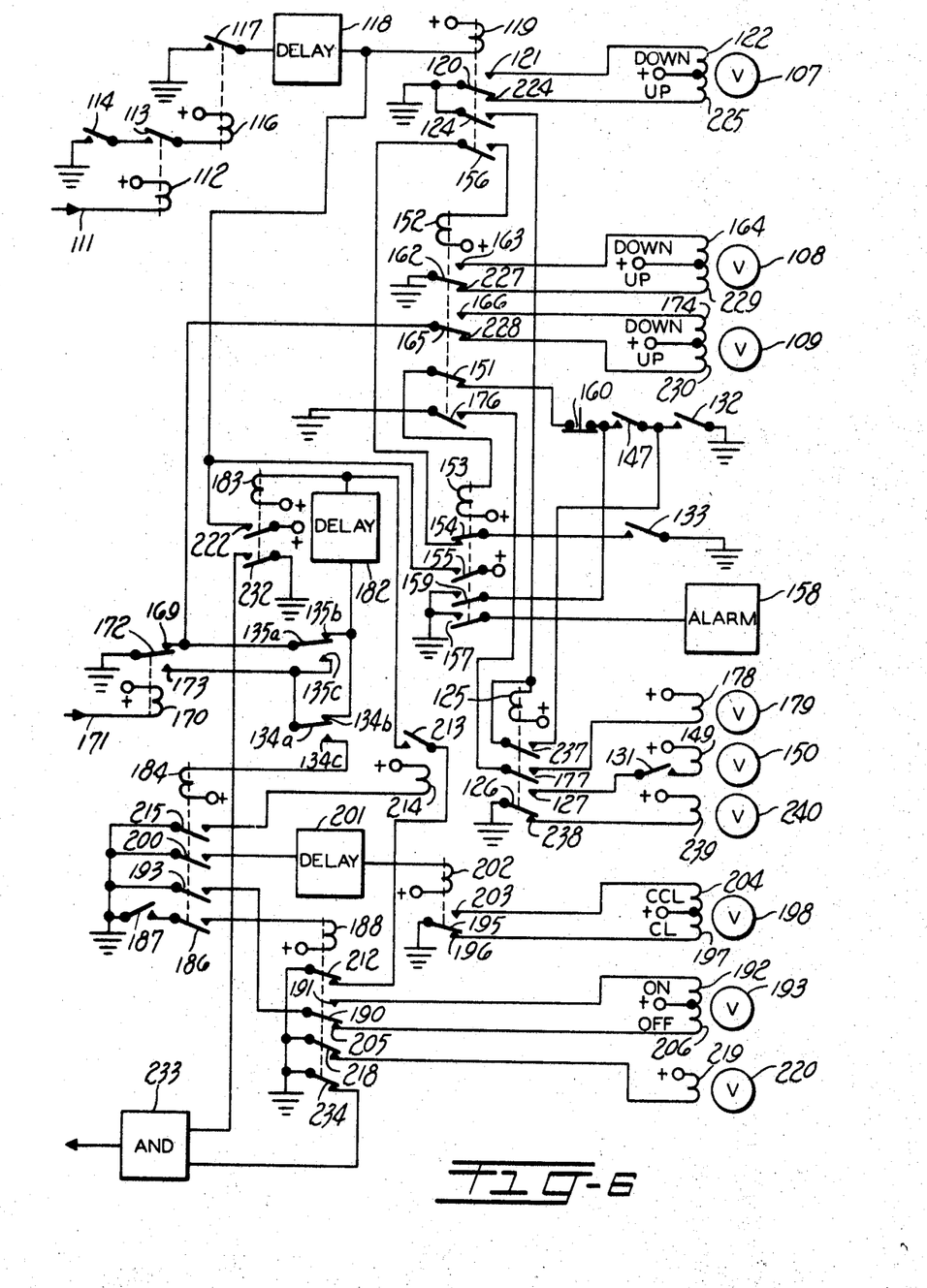
FIG. 6 is a detailed schematic of the unwrap control circuit shown in FIG. 5.

The unwrap control circuit 104 is shown in FIG. 6. Valves 107, 108 and 109 operate the respective air cylinders 34, 35 and 36 of FIG. 1. The valves 107, 108 and 109 are the magnetic latching type such that when the respective coil is energized, the valves 107, 108 and 109 remain actuated or deactuated to supply normal line pressure to respective inlets of the air cylinders 34–36 to retain the respective air cylinders 34–36 either fully extended or fully retracted.

A signal from the sequence control circuit 101 on line 111 operates a relay 112 to close a pair of contacts 113. The contacts 113 are in series with a switch 114 which is open when there is any exhaust from the X and Y positioning air cylinders 15–18 and 23–26. The switch 114 is closed when the exhaust from the cylinders 15–18 and 23–26 has ceased due to the positioning of the head 40 in the desired horizontal position. Closing of the contacts 113 when the switch 114 is closed, operates a relay 116 to close contacts 117. The contacts 117 operate a delay circuit 118 which then actuates a relay 119. The relay 119 moves a contact arm 120 to engage a contact 121 to operate a down solenoid 122 associated with the valve 107. The valve 107 actuates to supply air to the cylinder 34 (FIG. 1) to move the plate 30 downward with respect to the platform 20.

Referring to FIG. 2, at the end of a previous cycle of operation, the air cylinders 82 and 89 were operated to move the holding member 63 upward and the ejecting sleeve 67 downward to positions as shown in FIG. 4. At the start of a new cycle, the air pressures to the cylinders 82 and 89 are released, as explained hereafter, to retract the piston rods 84 and 90. The spring 93 lifts the member 91 and the spring 71 lifts the collar 70 to return the ejecting sleeve 67 to its upward position shown in FIG. 3.

Referring back to FIG. 6, operation of relay 119 also closes contacts 124 to operate a relay 125. Operation of the relay 125 moves a contact arm 126 into engagement with a contact 127 in series with a switch 131 and a solenoid 149 of a valve 150. The valve 150 is only actuated while the solenoid 149 is energized. A shuttle valve (not shown) normally applies a low air pressure which is reduced from the normal line pressure to the air cylinder 96 to maintain a light downward force on the shafts 60 and 58 (FIG. 2). Operation of the valve 150 supplies the normal line pressure to the air cylinder 96 to force shafts 60 and 58 and the holding member 63 downward to reset the tool 50.

Figure 7:
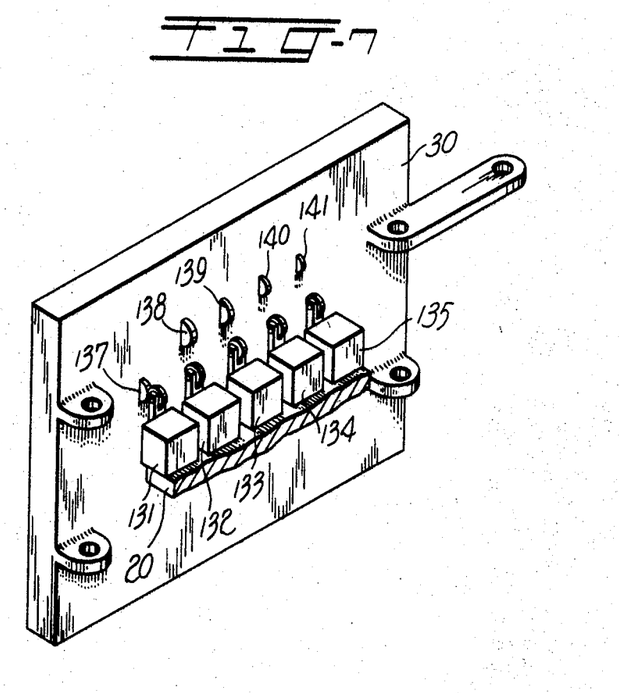
FIG. 7 is an isometric view of the back of the vertical moving plate of the apparatus shown in FIG. 1, particularly showing cams operating switches at various vertical positions of the plate.
Figure 8:
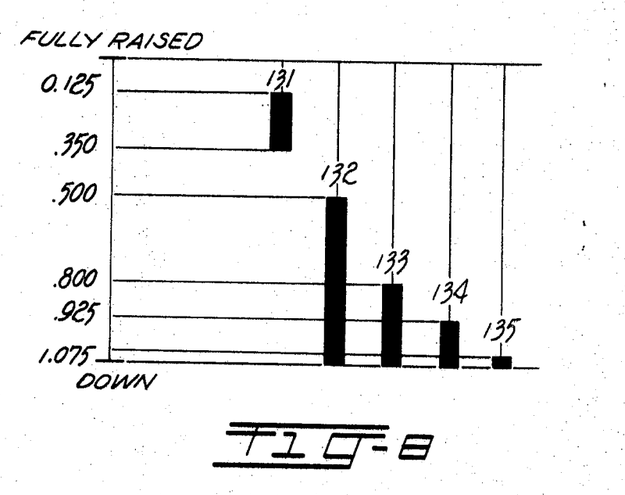
FIG. 8 is a graphical representation of the operation of the switches shown in FIG. 7.

Referring to FIG. 7, there are shown a plurality of switches 131–135 which are mounted on the platform 20 (FIG. 1). Contact arms of the respective switches 131–135 engage respective cams 137–141 mounted on the back of the plate 30. As the plate 30 is lowered by the air cylinders 34–36, the switches 131–135 are operated at various times by the cams 137–141 depending upon the vertical position of the plate 30. Referring to FIG. 8, there is shown a graph wherein the relative position of the plate 30 is shown with respect to the operating times of the switches 131–135. It is seen that the switch 131 is closed by the cam 137 only when the plate 30 is between 0.125 and 0.350 inch from the fully raised position to complete a circuit (FIG. 6) through the contact arm 126, the contact 127, and the solenoid 149 to reset the tool 50.

Referring to FIGS. 2 and 8, the air cylinder 34 moves the plate 30 and the head 40 downward for 0.800 of an inch. Downward movement of the platform 30 for 0.800 of an inch is sufficient for the extremity of the terminal 44 to be received in the opening 77 of the split sleeve 64 of the tool 50. If the terminal is bent or out of alignment or an obstruction, such as a wire, is in the path of the tool 50, the tool 50 engages the obstruction. Continued downward movement of the head 40 causes the tool 50 and the shafts 58 and 60 to slide upward relative to the head 40. A switch 147 is mounted on the platform 83 such that an arm of the switch 147 extends beneath the pinion 57. Previously, when the shaft 58 and pinion 57 were moved to their lowermost position by the air cylinder 96, the arm of the switch 147 is engaged to open the normally closed contacts of the switch 147. Movement of the tool 50, shaft 58, and pinion 57 upward, due to an obstruction, results in the closing of the contacts of the switch 147.

Referring to FIG. 6, the switch 147 is in series with the switch 132. Referring to FIG. 8, the switch 132 is closed when the plate reaches 0.500 of an inch from its fully raised position. If the tool 50 engages an obstruction during its downward movement to 0.790 of an inch below the fully raised position, the switch 147 is closed to complete a circuit through the switches 132, 147 and normally closed contacts 151 of a relay 152 to operate a relay 153. Operation of the relay 153 opens contacts 154 which are in series with a switch 133 and contacts 156 of the relay 119. Referring to the graph in FIG. 8, the switch 133 closes at 0.790 of an inch from the fully raised position or just before the air cylinder 34 reaches its end of travel to operate the relay 152 which then initiates the continued downward movement of the plate 30 and head 40. Operation of relay 153 however, prevents operation of the relay 152 and the continued downward movement of the head 40. Contacts 155 of the relay 153 are closed to deenergize the relay 119 which results in the raising of the head 40. Relay 153 also closes contacts 157 to operate an alarm 158 to alert the operator that the tool 50 has engaged an obstruction or bent terminal. Contacts 159 are closed by the relay 153 to complete a holding circuit through contacts 151. After the obstruction or the bent terminal has been corrected, the operator may release the relay 153 by depressing the switch 160 in series with the contacts 151 and 159 to again start the unwrapping cycle.

If the tool 50 does not engage the obstruction, the switch 133 closes to actuate the relay 152. Operation of the relay 152 moves a contact arm 162 into engagement with a contact 163 to energize a down solenoid 164 of the valve 108. The valve 108 supplies air to the air cylinder 35 to move the plate 30 an additional 0.125 of an inch downward. A contact arm 165 of relay 152 is moved into engagement with a contact 166. The contact arm 165 is connected to a contact 169 of a relay 170. The relay 170 is connected by a line 171 to the card reader 102 of FIG. 5. The card which is controlling the unwrapping of the selected terminal has information concerning at what level the wrap is located. The wrap may be located in two positions, a lower position and an upper position. If the wrap is in the upper position, the relay 170 will be actuated to move a contact arm 172 out of engagement with the contact 169 and into engagement with a contact 173. If the wrap is in the lower position, a circuit is completed through the contact arm 172, contact 169, contact arm 165, contact 166, to operate a down solenoid 174 of the valve 109. The valve 109 supplies air to the air cylinder 36 to lower the platform 30 by an additional 0.150 of an inch.

The actuation of relay 152 closes a pair of contacts 176 which are connected in series with contacts 177 of the relay 125. Since the contacts 177 were closed at the start of the downward motion, a solenoid 178 of a valve 179 is energized to operate the valve 179. The valve 179 supplies air through a shuttle valve (not shown) to the air cylinder 96. The air pressure supplied by the valve 179 has a higher pressure than the reduced air pressure normally supplied to the air cylinder 96. The higher pressure provides additional pressure by the projection 80 of the bit 75 on the wrapped wire 45 on the terminal 44. This insures that the projection 80 of the bit 75 engages the end of the wrapped wire to loosen the wire during rotation of the tool 50.

As previously mentioned, the head 40 descends to one of two positions, depending upon whether valve 109 is actuated or not. Referring to FIGS. 7 and 8, there is shown a switch 134 which is operated when the head 40 reaches the first down position and a switch 135 which is operated when the head reaches its second down position. Referring back to FIG. 6, the switch 134 is shown to have contacts 134*b* and 134*c* which are alternately engaged by a contact arm 134*a*. Similarly, the switch 135 has contacts 135*b* and 135*c* which are alternately engaged by a contact arm 135*a*. When the head 40 reaches the first down position, the contact arm 134*a* is moved out of engagement with the contact 134*b* and into engagement with the contact 134*c*. If the relay 170 has been operated to engage the contact arm 172 with the contact 173, a ground connection to a delay circuit 182 is interrupted by the moving of the contact arm 134*a* from the contact 134*b*. Also, engagement of the contact arm 134*a* with the contact 134*c* completes a circuit to operate a relay 184. If the relay 170 has not been operated, the ground connection to the delay circuit 182 is not interrupted until the head 40 reaches the second down position to move the contact arm 135*a* out of engagement with the contact 135*b*. Also, the relay 184 is not operated until the contact arm 135*a* engages the contact 135*c*.

Operation of the relay 184 closes contacts 186 which are in series with a normally closed switch 187 to operate a relay 188. Operation of relay 188 moves a contact arm 190 into engagement with a contact 191 to complete a circuit through an ON-solenoid 192 of a valve 193. The contact arm 190 is connected in series with contacts 193 which have just previously been closed by operation of the relay 184. The valve 193 turns on an air pressure supply for the two direction air motor 52 of FIG. 2. A contact arm 195 of a relay 202 normally engages a contact 196 to keep a clockwise solenoid 197 of a valve 198 energized. The valve 198 directs the air pressure supply from the valve 193 to the air motor 52 such that the motor 52 begins rotation in a clockwise direction.

Operation of relay 184 also closes contacts 200 which operate a delay circuit 201. After a certain period of time, for example one second, the delay circuit 201 operates a relay 202. The relay 202 moves the contact arm 195 from engagement with the contact 196 into engagement with a contact 203. This deenergizes the clockwise winding 197 of the valve 198 and energizes a counterclockwise winding 204 of the valve 198 to reverse the direction of the air supplied to the air motor 52. This starts the counterclockwise rotation of the air motor 52, if the relay 188 has not been deenergized previously. Thus, if the wire 45 is wrapped clockwise, the clockwise rotation of the tool 50 fails to loosen the wire 45, but the subsequent counterclockwise rotation will loosen the wire 45. The delay time of the delay circuit 201 is chosen to insure that sufficient clockwise rotation of the tool 50 occurs to loosen a wire wrapped counterclockwise.

Referring back to FIG. 2, the switch 187 is shown mounted on the support 53 of the head 40. A bar 207 which is frictionally mounted on the shaft 60 is held by a guide member 208 for limited vertical movement with the shaft 60. The shaft 60 is connected to the shaft 58 by the bearing 61 such that the shaft 60 is moved vertically with the shaft 58 but the shaft 60 does not rotate with the shaft 58. The amount of vertical movement may be adjusted by a pair of opposing set screws 209 and 210. The magnitude of downward motion of the head 40 is chosen so that the bit 75 engages the wrapped wire 45 on the terminal 44 to slide the bit 75, the housing 62 and the shafts 58 and 60 upwards relative to the head 40 sufficiently to move the bar 207 against the upper set screw 209. As the tool 50 and bit 75 are rotated and engage the wrapped wire 45, the wire is unwrapped until it becomes loose on the terminal 44 which results in the loosened wrapped wire slipping downward on the terminal 44 due to the force of the air cylinder 96 transmitted through the shafts 58 and 60 and the bit 75. The shafts 58 and 60 and the bit 75 move downward to move the bar 207 downward to engage and open the switch 187. Opening of the switch 187 deactuates the relay 188 (FIG. 6).

The delay circuit 182 is of the type wherein removal of a ground from the delay initiates the timing of the delay which subsequently applies a ground to the output of the delay circuit. Thus, after a predetermined delay, for example two seconds, the delay circuit 182 operats a relay 183. Operation of the relay 183 causes the termination of the unwrapping cycle. The delay time of the delay circuit 182 is chosen to insure that the rotation of the tool 50 has been reversed sufficiently long enough to unwrap a wire which is wrapped clockwise on the terminal 44.

Deactuation of delay 188 by the opening of the switch 187, closes contacts 212 which are in series with contacts 213. The contacts 213 are closed by a relay 214 which is operated by contacts 215 of the relay 184. The contacts 213 and 212 bypass the delay circuit 182 to actuate the relay 183 to terminate the unwrap cycle prior to the delay time of the delay circuit 182. Normally, the wrapped wire 45 is loosened in less than one second of rotation of the tool 50 in either the clockwise or counterclockwise directions. The delay circuit 182 operates the relay 183 only in the event that the wrapped wire 45 is not loosened by one second of clockwise rotation or by the subsequent one second of counterclockwise rotation.

Also, deenergization of relay 188 closes contacts 218 to energize a solenoid 219 of the valve 220. The valve 220 supplies an air pressure to the air cylinder 82 of FIG. 2 to extend the piston rod 84 against the pinion 57 with force sufficient to counteract the downward force on the bit 75 (FIG. 3) due to the normally low pressure of the air cylinder 96 on the shafts 58 and 60. This prevents the air cylinder 96 from moving the loosened wrapped wire 45 further down on the terminal 44. Also, contact arm 190 is returned to engagement with a contact 205 to energize an OFF-solenoid 206 of the valve 193. This stops the rotation of the motor 52.

Operation of the relay 183 at the end of the cycle either by the running of the delay circuit 182 or the deenergization of the relay 188 by the opening of the switch 187 closes contacts 222 to deenergize the relay 119. The contact arm 120 thus disengages the contact 121 and reengages contact 224 to energize an UP-solenoid 225 of the valve 107. The relay 152 is deenergized by the opening of the contacts 156 to move the contact arms 162 and 165 out of engagement with the respective contacts 163 and 166 and into engagement with contacts 227 and 228 to energize respective UP-solenoids 229 and 230 of the respective valves 108 and 109. Thus, the air cylinders 34, 35 and 36 raise the plate 30 and the head 40 from the terminal board to pull the loosened wire 45 from the terminal 44.

The energization of the relay 183 also closes contacts 232 which applies an input signal to one input of an AND gate 233. A second input to the AND gate 233 is applied by the closing of contacts 234 upon the deenergization of relay 188. Thus, if the relay 188 is energized by the opening of the switch 187 followed by the energization of relay 183, the AND gate 233 produces an output signal which is applied to the sequence control circuit 101 of FIG. 5 to subsequently initiate the beginning of another cycle. The sequence control circuit 101 removes the signal from line 111 to deenergize the relays 112 and 116.

Upward movement of the plate 30 returns the switches 135, 134 and 133 to their initial positions to deenergize the relays 184, 214, 183 and 202. During the upward movement of the head 40, the relay 125 remains energized through a holding circuit completed by contacts 237 which are connected in series with the switch 132. Referring to FIG. 8, the switch 132 remains closed until the head reaches 0.500 of an inch below its UP-position. At this time, the switch 132 opens to deenergize the relay 125. Deenergization of the relay 125 moves contact arm 126 from engagement with the contact 127 and into engagement with a contact 238 to energize a solenoid 239 of a valve 240. The valve 240 is connected by a shuttle valve to the air cylinder 82 to supply line pressure which is a higher pressure than is supplied by the valve 220 to counteract the low pressure from air cylinder 96. The operation of air cylinder 82 extends the piston rod 84 to raise the shaft 58 and the holding member 63 in the tool 50. This allows the split sleeve 64 to open. At the same time the valve 240 applies air pressure to the air cylinder 89 to lower the piston rod 90 and press the collar 70 downward. Depressing of the collar 70 moves the ejecting sleeve 67 downward to eject the wrap from the split sleeve 64 as shown in FIG. 4. The split sleeve 64 remains open until the start of a new cycle energizes relay 125 to close the sleeve 64. The head 40 then returns to its uppermost position in preparation for another cycle of operation.

The above-described embodiment is simply illustrative of the principles of the invention and many other embodiments may be devised without departing from the scope and spirit of the invention.

What is claimed is:

1. An apparatus for removing a wire wrapped on a terminal comprising:

a tool including rotating means for engaging an extremity of the wrapped wire to loosen the wrapped wire and means for holding the loosened wrapped wire;

a source of control signals;

first means responsive to the control signals for moving the tool relative to the terminal to a position in alignment with a longitudinal axis through the terminal; and second means responsive to the control signals for advancing and retracting the tool along the axis through the terminal such that the terminal and wrapped wire is received by the tool when the tool is advanced, and the loosened wrapped wire is pulled from the terminal when the tool is retracted.

2. An apparatus for loosening a wire wrapped on a terminal wherein the wire may be wrapped clockwise or counterclockwise, comprising:

a rotatable tool having a bore for receiving the extremity of the terminal and a projection adjacent the bore for engaging the extremity of a wire wrapped on the terminal; and means for rotating the tool in a first driection for a predetermined duration and then in a second direction for a predetermined duration to unwrap the wire.

3. An apparatus for removing a wire wrapped on a terminal comprising:

a tool including rotating means for engaging the extremity of the wrapped wire to loosen the wrapped wire and means for holding the loosened wrapped wire;

means for advancing and retracting the tool relative to the terminal such that the terminal is received by the tool when the tool is advanced, and the loosened wrapped wire is pulled from the terminal when the tool is retracted; and means for sensing the loosened wrapped wire to initiate the retraction of the advancing and retracting means.

4. An apparatus for loosening a wire wrapped on a terminal comprising:

a rotatable tool having means for receiving the extremity of the terminal and means for engaging the extremity of the wrapped wire to loosen the wrapped wire;

means for advancing and retracting the tool relative to the terminal such that the terminal is received by the tool when the tool is advanced; and means for sensing an obstruction in the path of the tool to stop advancement of the tool.

5. An apparatus for removing a wire wrapped on a terminal as defined in claim 1, and which includes:

means for rotating the tool in a first direction for a predetermined duration and then in a second direction for a predetermined duration to unwrap the wire regardless of whether the wire is wrapped clockwise or counterclockwise.

6. An apparatus for removing a wire wrapped on a terminal as defined in claim 1 and which includes:

means for sensing the loosened wrapped wire to initiate the retration of the advancing and retracting means.

7. An apparatus for loosening a wire wrapped on a terminal, as defined in claim 1, and which includes:

means for sensing an obstruction in the path of the tool to stop advancement of the tool.

8. An apparatus for removing a wire wrapped on a terminal as defined in claim 1, and which includes:

means for rotating the tool in a first direction for a predetermined duration and then in a second direction for a predetermined duration to unwrap the wire regardless of whether the wire is wrapped clockwise or counterclockwise; and means for sensing the loosened wrapped wire to initiate the retraction of the advancing and retracting means.

9. An apparatus for removing a wire wrapped on a terminal as defined in claim 1, and which includes:

means for rotating the tool in a first direction for a predetermined duration and then in a second direction for a predetermined duration to unwrap the wire regardless of whether the wire is wrapped clockwise or counterclockwise; and means for sensing an obstruction in the path of the tool to stop advancement of the tool.

10. An apparatus for loosening a wire wrapped on a terminal wherein the wire may be wrapped clockwise or counterclockwise as defined in claim 2 and which includes:

means for advancing and retracting the tool relative to the terminal such that the extremity of the terminal is received in the bore when the tool is advanced and the projection on the tool engages the extremity of a wire wrapped on the terminal; and means for sensing an obstruction in the path of the tool to stop advancement of the tool.

11. An apparatus for removing a wire wrapped on a terminal, as defined in claim 3, and which includes:

means for rotating the tool in a first direction for a predetermined duration and then in a second direction for a predetermined duration to unwrap the wire.

12. An apparatus for removing a wire wrapped on a terminal, as defined in claim 3, which includes:

means for sensing an obstruction in the path of the tool to stop advancement of the tool.

13. An apparatus for removing a wire wrapped on a terminal, as defined in claim 3, and which includes:

means for rotating the tool in a first direction for a predetermined duration and then in a second direction for a predetermined duration to unwrap the wire; and means for sensing an obstruction in the path of the tool to stop advancement of the tool.

14. An apparatus for removing a wire wrapped on a terminal as defined in claim 3, wherein the loosened wire sensing means includes:

means for biasing the tool against the wrapped wire as it is rotated to loosen the wrap; and means responsive to movement of the tool due to the wrapped wire slipping on the terminal to initiate the retraction of the advancing and retracting means.

15. An apparatus for removing a wire wrapped on a terminal, as defined in claim 3, and which includes:

a shaft connected to the tool along the axis of the tool; and wherein the loosened wire sensing means includes:
means for biasing the shaft to force the tool;
an appendage extending radially from the shaft mounted for movement with the shaft; and
a switch adjacent to the appendage such that movement of the shaft and the appendage when the wrapped wire slips on the terminal actuates the switch.

16. An apparatus for loosening a wire wrapped on a terminal, as defined in claim 4, wherein the tool is frictionally supported by the advancing and retracting means and wherein the obstruction sensing means includes:

means for sensing movement of the tool relative to the advancing and retracting means to indicate that the tool has engaged an obstruction and to stop advancement of the tool.

17. An apparatus for removing a wire wrapped on a terminal comprising:

a tool including rotating means for receiving and engaging the extremity of the wrapped wire to loosen the wrapped wire and means for holding the loosened wrapped wire;

means frictionally supporting the tool for advancing and retracting the tool relative to the terminal such that the terminal is received by the tool when the tool is advanced and the loosened wrapped wire is pulled from the terminal when the tool is retracted;

means for biasing the tool against the extremity of the wrapped wire;

first means for sensing movement of the tool relative to the advancing and retracting means to indicate the engagement of the tool with an obstruction to stop advancement of the tool; and second means for sensing movement of the tool indicating that the wrapped wire is loose to initiate the retraction of the advancing and retracting means.

18. An apparatus for removing a wire wrapped on a terminal as defined in claim 17, and which includes:
means for rotating the tool in a first direction for a predetermined duration and then in a second direction for a predetermined duration to unwrap the wire regardless of whether the wire is wrapped clockwise or counterclockwise.

References Cited

UNITED STATES PATENTS

| | | | |
|---|---|---|---|
| 2,998,034 | 8/1961 | Mann et al. | 140—123 |
| 3,019,517 | 2/1962 | Lovecky | 29—203 |
| 3,378,906 | 4/1968 | Dorsey | 140—124 |

LOWELL A. LARSON, Primary Examiner

U.S. Cl. X.R.

29—203